US011579932B2

(12) United States Patent
Thakkar et al.

(10) Patent No.: US 11,579,932 B2
(45) Date of Patent: Feb. 14, 2023

(54) TIERED BACKUP ARCHIVAL IN MULTI-TENANT CLOUD COMPUTING SYSTEM

(71) Applicant: VMware, Inc., Palo Alto, CA (US)

(72) Inventors: Sachin Thakkar, San Jose, CA (US); Debashis Basak, San Jose, CA (US); Venu Gopala Rao Kotha, Bangalore (IN); Pooja Naik, Milpitas, CA (US); Allwyn Sequeira, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 340 days.

(21) Appl. No.: 15/690,246

(22) Filed: Aug. 29, 2017

(65) Prior Publication Data

US 2018/0060176 A1 Mar. 1, 2018

Related U.S. Application Data

(60) Provisional application No. 62/380,945, filed on Aug. 29, 2016.

(51) Int. Cl.
*G06F 11/14* (2006.01)
*G06F 9/50* (2006.01)
(Continued)

(52) U.S. Cl.
CPC ........ *G06F 9/5038* (2013.01); *G06F 9/45558* (2013.01); *G06F 9/461* (2013.01); *G06F 9/4881* (2013.01); *G06F 9/5077* (2013.01); *G06F 11/1448* (2013.01); *G06F 11/1451* (2013.01); *G06F 11/1461* (2013.01); *G06F 11/1464* (2013.01); *G06F 16/113* (2019.01); *G06F 16/182* (2019.01); *G06F 2009/45562* (2013.01); *G06F 2009/45575* (2013.01); *G06F 2009/45583* (2013.01); *G06F 2009/45595* (2013.01); *G06F 2201/81* (2013.01); *G06F 2201/815* (2013.01); *G06F 2201/84* (2013.01)

(58) Field of Classification Search
CPC ....... G06F 2009/45583; G06F 11/1448; G06F 17/30073; G06F 17/30194; G06F 11/1464; G06F 9/461; G06F 2009/45575; G06F 2009/45562; G06F 9/45558; G06F 11/1451; G06F 9/4881; G06F 2201/84; G06F 2009/45595; G06F 9/5077; G06F 16/182; G06F 11/1461; G06F 2201/81; G06F 2201/815; G06F 16/113
USPC ................................................. 711/162, 161
See application file for complete search history.

(56) References Cited

U.S. PATENT DOCUMENTS

| 9,684,563 | B1 | 6/2017 | Wartnick |
| 2002/0099854 | A1 | 7/2002 | Jorgensen |

(Continued)

*Primary Examiner* — David Yi
*Assistant Examiner* — Zubair Ahmed
(74) *Attorney, Agent, or Firm* — Patterson + Sheridan, LLP

(57) ABSTRACT

A system and method for backing up workloads for multiple tenants of a cloud computing system are disclosed. A method of backing up workloads for multiple tenants of a computing system includes triggering an archival process according to an archival policy set by a tenant, and executing the archival process by reading backup data of the tenant stored in a backup storage device of the computer system and transmitting the backup data to an archival store designated in the archival policy, and then deleting or invalidating the backup data stored in the backup storage device.

12 Claims, 9 Drawing Sheets

(51) Int. Cl.
  *G06F 9/48* (2006.01)
  *G06F 9/455* (2018.01)
  *G06F 16/11* (2019.01)
  *G06F 9/46* (2006.01)
  *G06F 16/182* (2019.01)

(56) References Cited

U.S. PATENT DOCUMENTS

| | | | |
|---|---|---|---|
| 2004/0205206 A1 | 10/2004 | Naik et al. | |
| 2011/0202735 A1* | 8/2011 | Kono | G06F 11/1458 |
| | | | 711/162 |
| 2012/0102088 A1* | 4/2012 | Bindal | G06F 11/1461 |
| | | | 709/203 |
| 2012/0117029 A1* | 5/2012 | Gold | G06F 11/1451 |
| | | | 707/651 |
| 2013/0132561 A1 | 5/2013 | Pasala et al. | |
| 2013/0339390 A1* | 12/2013 | Muller | G06F 11/1464 |
| | | | 707/782 |
| 2016/0371153 A1* | 12/2016 | Dornemann | G06F 11/1464 |
| 2016/0373291 A1 | 12/2016 | Dornemann | |
| 2017/0126469 A1* | 5/2017 | Liang | H04L 41/04 |
| 2018/0060182 A1 | 3/2018 | Rao Kotha et al. | |

* cited by examiner

TIERED BACKUP ARCHIVAL IN MULTI-TENANT CLOUD COMPUTING SYSTEM

CROSS-REFERENCE TO RELATED APPLICATION(S)

This application claims the benefit of U.S. Provisional Patent Application No. 62/380,945, filed Aug. 29, 2016, the entire contents of which are incorporated by reference herein.

BACKGROUND

A cloud computing system of a cloud provider has a large number of hosts supporting many, perhaps thousands, of virtual machines (VMs) to meet the requirements of its cloud customers. The cloud provider performs various services for its cloud customers including data protection service (DPS).

DPS is offered in several forms. The first is provided in the same cloud in which the VMs are provisioned. In this context, the "same cloud" means that high-speed local area network (LAN) connections are available between host computers of the VMs being backed up and a backup storage device that is storing the backup data. This first form of DPS is referred to herein as "on-site backups."

Another form of DPS is off-site backups. Off-site backups may be carried out in another cloud computing system or even in a data center owned by the cloud customer. In these situations, the workload can be restored from the backup data at the off-site location.

As compared to on-site and off-site backups described above, a more inexpensive storage solution is archival. Using archival, storage costs are significantly lowered because the ability to store large amounts of data reliably for long periods of time, which can be provided by cheaper forms of storage, such as object stores, is emphasized over data retrieval speeds. Because of the slow data retrieval speeds, however, archival storage is typically used for older versions of backup data, and in general where the likelihood of the data being accessed again very low.

SUMMARY

One or more embodiments provide techniques for archiving backup data in a multi-tenant cloud computing environment. A method of backing up workloads for multiple tenants of a computing system, according to an embodiment, includes triggering an archival process according to an archival policy set by a tenant, and executing the archival process by reading backup data of the tenant stored in a backup storage device of the computer system and transmitting the backup data to an archival store designated in the archival policy, and then deleting or invalidating the backup data stored in the backup storage device.

Further embodiments include a non-transitory computer-readable storage medium that includes instructions for a processor to carry out the above method, and a computer system that includes a processor programmed to carry out the above method.

DETAILED DESCRIPTION

In the embodiments disclosed herein, a virtual machine is described as an example of a workload that is backed up. In general, a "workload" is some or all of the data specified in a tenant's SLA as requiring a backup. A workload may be a file, an object, a virtual machine, or a consistency group. An object is a group of files that must be backed up together as a single workload, such as for example, user mailboxes of an exchange server associated with a tenant. A consistency group is a group of virtual machines that must be backed up together as a single workload, such as for example, a group of virtual machines needed to execute a particular application.

Figure 1:
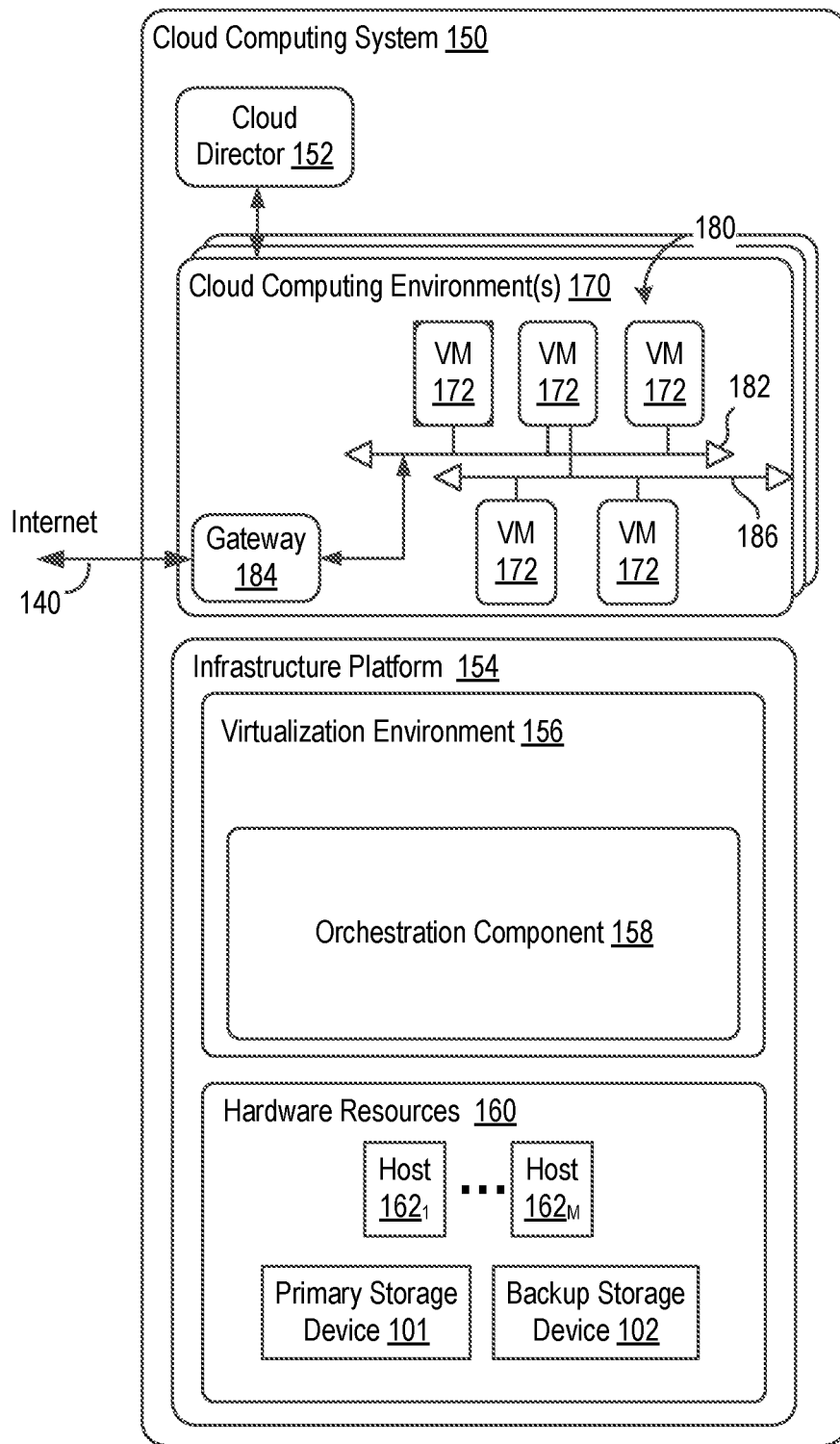
FIG. 1 is a block diagram of a cloud computing system in which embodiments may be practiced.

FIG. 1 is a block diagram of a cloud computing system 150 in which one or more embodiments may be utilized. Cloud computing system 150 is configured to dynamically provide an enterprise (or users of an enterprise) with one or more virtual data centers 170 in which a user may provision VMs 172, deploy multi-tier applications on VMs 172, and/or execute workloads. Cloud computing system 150 includes an infrastructure platform 154 upon which a cloud computing environment 170 may be executed.

In the particular embodiment of FIG. 1, infrastructure platform 154 includes hardware resources 160 having computing resources (e.g., hosts $162_1$ to $162_N$), storage resources including primary storage device 101 and backup storage device 102, and networking resources, which are configured in a manner to provide a virtualization environment 156 that supports the execution of a plurality of virtual machines 172 across hosts 162.

Each cloud computing environment 170 is associated with a particular tenant of cloud computing system 150. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired.

In one embodiment, cloud computing system 150 may include a cloud director 152 (e.g., running in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing.

According to embodiments, orchestration component 158 triggers a backup to be performed by a data protection server according to the SLAs of the tenants. As part of the backup SLA, each tenant defines: (1) retention period (for how many days the backed up data must be retained); (2) time window in which backup will run automatically; and (3) recurrence policy (how frequently the backup should run: daily, weekly, or monthly). Violation of any of these policies would result in violation costs for the cloud provider.

Figure 2:
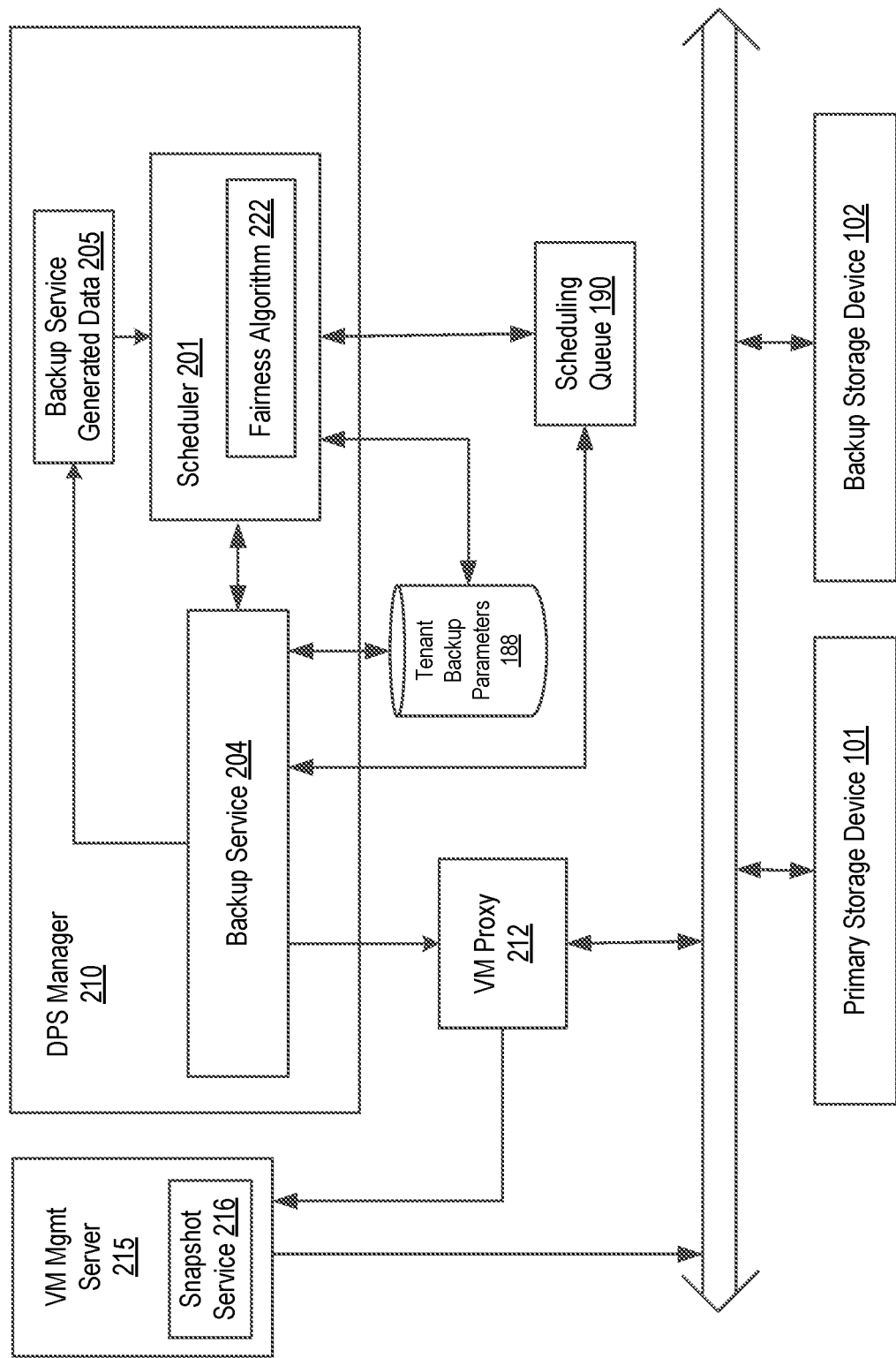
FIG. 2 is a schematic diagram that depicts a backup process for a plurality of VMs running in the cloud computer system.

FIG. 2 is a schematic diagram that depicts a backup process for a plurality of VMs running in the cloud computer center, when the backup is triggered by orchestration component 158. In one embodiment, the backup process depicted in FIG. 2 is carried out by a data protection service (DPS) manager 210 in conjunction with a VM management server 215, both of which are parts of orchestration component 158 of cloud computing system 150. DPS manager 210 includes a scheduler 201 that schedules backups of a tenant according to a fairness algorithm, which is further described below, which takes into account tenant's backup parameters 188, such as SLA data, and backup service generated data 205, which is further described below. DPS manager 210 further includes a backup service 204 that coordinates backup operations with one or more backup agents running in hosts 162. In one embodiment, the backup agent is a VM running in hosts 162, and is referred to herein as a VM proxy.

Tenant's backup parameters 188 specify attributes of VMs that are to be backed up, such as frequency, time window for the backup, and the SLA, where a higher SLA means higher priority and higher costs for violating the SLA. Other attributes include history information such as the number of recent backup attempts, failures, and successes, and one or more of the following:
 (1) Application consistency group;
 (2) Mandate for daily backup;
 (3) Mandate for weekly offsite replicas;
 (4) Both (2) and (3); and
 (5) Backup within a time window of 2 am to 4 am, and if that fails, backup from 7 pm to 9 pm.

Figure 3:
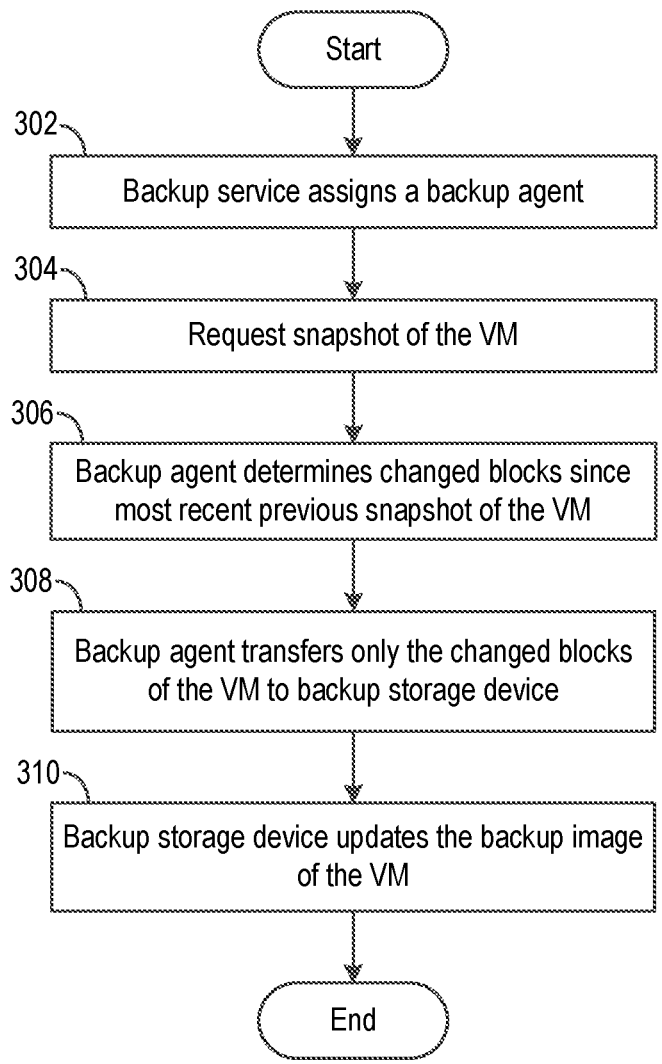
FIG. 3 is a flow diagram depicting a backup process for an individual VM according to an embodiment.

FIG. 3 depicts a backup process 300 for an individual VM according to an embodiment. To perform the backup, in step 302, backup service 204 assigns a backup agent (e.g., one of the virtual machines, VM proxy 212) for the VM to be backed up. In response, the backup agent communicates with a snapshot service 216 in VM management server 215 to take a backup snapshot of the VM. Snapshot service 216 takes the backup snapshot of the VM in step 304. Then, VM proxy 212 in step 306 determines data blocks of the VM that have changed since the most recent previous backup snapshot, and in step 308 updates the backup image of the VM in backup storage 102 with the changed blocks determined in step 306.

During the backup process, backup service 204 generates data (referred to herein as backup service generated data 205) which are used by scheduler 201 to place backups in scheduling queue 190. Backup service generated data 205 includes (a) a predicted total backup time for each VM needing backup during the next scheduling window, (b) a predicted SLA violation cost (cost metric) for each VM if not backed up, and (c) a number of system constraints, which reflect limitations in the data center. System constraints include the following:

Maximum number of possible IO connections supported by the backup server;
Maximum IO read and write rates supported by the backup server;
Maximum IO reads of the primary storage;
Network bandwidth between the primary storage and the backup storage;
CPU cycles available on the backup server;
CPU cycles available on the hosts; and
Maximum threads supported by the backup agent.

It is desirable to maximize the number of VMs backed up and reduce or eliminate the service agreement violations without expanding the resources of cloud computing system 150, which requires additional infrastructure costs.

In a multi-tenant cloud computing system, different tenants that have enabled backups will have an associated RTO and RPO for their backups (and stored as part of tenant backup parameters 188) and it will be up to DPS manager 210 to perform the backups in accordance with the tenant RTOs and RPOs. In addition, the tenants may set a time window (e.g., 2 AM to 4 AM) and additional parameters (such as frequency, daily, weekly, monthly) for performing the backups, e.g., during off-peak hours. However, because one tenant sets its backup schedule and additional parameters without knowledge of backup schedules and additional parameters set by other tenants, the backup schedules and/or the additional parameters may conflict such that it might not be possible to satisfy all of the backup requirements of all tenants of the cloud computing system.

According to embodiments, a fairness algorithm implemented in scheduler 201 accounts for backup schedules and additional parameters set by all tenants who have enabled backups, and hard/physical resource and network constraints, to schedule the backups of multiple tenants. Consequently, multiple tenants may share the same physical storage array for storing backups, and the advantages offered by deduplication backup servers can be continued to be leveraged by the cloud computing system. As known in the art, "deduplication" is a process that allows efficient use of storage space. Typical computer file systems store file data in small, fixed-size blocks, referred to by pointers maintained in metadata associated with each file. In the event two pointers refer to identical blocks, some storage capacity can be reclaimed by changing one or both pointers so that they refer to the same block. The process of finding pointers that refer to identical blocks and then changing one or both pointers so that they point to the same block is known as "deduplication."

In one embodiment, the hardware constraints that the fairness algorithm takes into account include storage capacity of backup storage device 102, input/output operations per second (IOPS) of backup storage device 102, and concurrency of backup storage device 102 (which represents the rate data can be ingested by the backup server). Based on these constraints (and in some embodiments, other constraints including the system constraints listed above), the fairness algorithm determines whether to schedule a backup at the client specified time or not. In cases where a VM that is backed up goes down, the fairness algorithm gives priority to recovery or restoring of that VM over any scheduled backups.

FIG. 3 describes the use of snapshots to determine incremental changes to VMs and performs backups of only the changed blocks of the VMs. In another embodiment, backup service 204 does not rely on snapshot manager 215. Instead, backup service 204 quiesces IOs of the VM prior to backing up that VM and transmits the entire image of that VM to backup storage device 102 for storage therein. After receiving acknowledgment from backup storage device 102 that the entire image of the VM has been stored in backup storage device 102, backup service 204 resumes the IOs of the VM.

Figure 4:
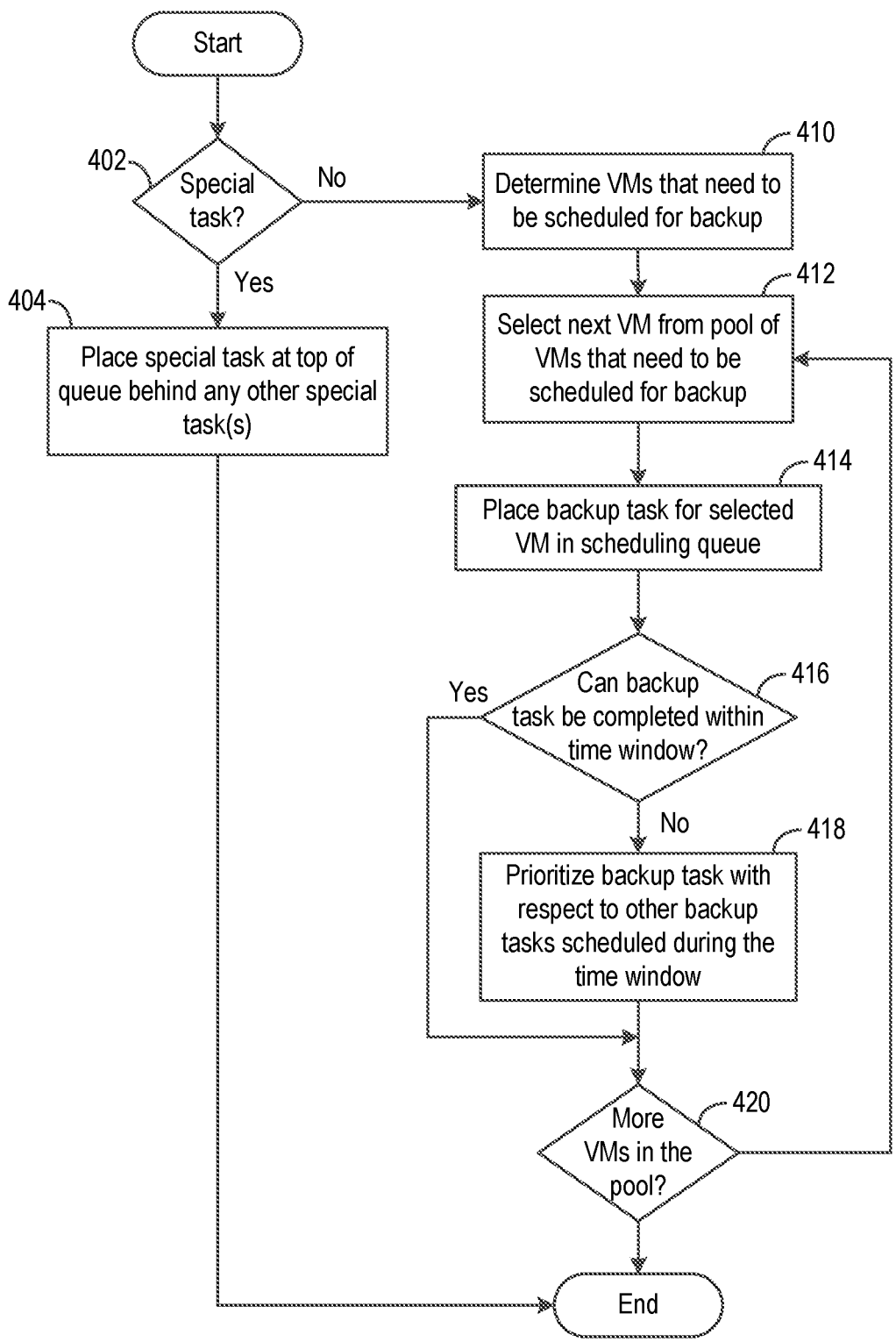
FIG. 4 is a flow diagram depicting a process for scheduling a task to be carried out by a backup storage device according to an embodiment.

FIG. 4 is a flow diagram that depicts a process for scheduling (by scheduler 201) a task to be carried out by backup storage device 102, according to an embodiment. The process is triggered by a request for a special task, such as recovery or restoring of a VM that went down or a backup demanded by a tenant to be carried out immediately. The process is also triggered periodically at the beginning of a time window for performing backups by backup storage device 102 so that scheduling queue 190 can be prepared for consumption by backup storage device 102 during the time window.

The process depicted in FIG. 4 begins in step 402, where scheduler 201 determines whether or not the task to be scheduled is a special task. Two types of special tasks are described herein. The first is a task to recover or restore a VM from a backup image of the VM stored by backup storage device 102. The second is a backup task that a tenant has demanded to be carried out immediately. In one embodiment, these on-demand backups are treated as tiered sales, requiring the tenant to pay a premium for such backups. If the task is determined to be a special task in step 402, scheduler 201 places the special task in scheduling queue 190 ahead of all non-special tasks, such a normal backup tasks, and behind other special tasks that scheduler 201 may have placed in scheduling queue 190 at an earlier time.

If the task is determined not to be special task in step 402, which means that the process is being triggered to prepare scheduling queue 190 for consumption by backup storage device 102, scheduler 201 in step 410 determines a pool of VMs that are to be backed up during the time window. For example, if the time window is from 2 AM to 4 AM, the process of FIG. 4 would be triggered at 2 AM. As described above, scheduler 201 obtains information about which VMs are to be backed up during the time window (e.g., 2 AM to 4 AM) from tenant backup parameters 188. In addition to the VMs that are designated in tenant backup parameters 188 to be backed up during the time window, there may be other VMs that have been added to the pool, e.g., VMs that were scheduled to be backed up during a prior time window but could not be backed up within that prior time window. For example, if a VM is scheduled to be backed up on a weekly basis, every Monday 2 AM to 4 AM, and the VM could not be backed up on a particular Monday 2 AM to 4 AM, the VM may be added to the pool of VMs being backed up on the following Tuesday 2 AM to 4 AM. Alternatively, such a VM may be added to the pool of VMs being backed up during the time window directly following Monday 2 AM to 4 AM, which would be Monday 4 AM to 6 AM. In addition, VMs in the pool may belong to different tenants. In one embodiment, some of the VMs in the pool belong to a first tenant, e.g., AAA Inc., and some of the VMs in the pool belong to a second tenant, BBB Corp.

After the pool of VMs to be backed up during the time window are identified in step 410, scheduler 201 executes steps 412, 414, 416, 418 (if needed), and 420 for each VM in the pool. Each of steps 412, 414, 416, 418, and 420 is further described below.

In step 412, scheduler 201 selects one of the VMs in the pool that has not yet been scheduled. Then, scheduler 201 places a backup task for backing up the selected VM in scheduling queue 190. The priority given to the backup task in the queue may be computed according to any technically feasible technique that takes into account one or more of the following attributes of the VM to be backed up: SLA, cost in violating the SLA, size of VM data to be updated, consistency group of the VM (because other VMs within the same consistency group will need to be backed up to provide a consistent backup state), and time of last backup.

In step 416, scheduler 201 evaluates, based on the system constraints contained in the backup service generated data 205 and the size of the VM data to be updated, whether the backup task being added can be completed on time. If so, scheduler 201 places the backup task in scheduling queue 190. If not, scheduler 201 performs a prioritization of the backup tasks in scheduling queue 190 including the backup task being added in step 418. Prioritization in this context means ordering of the backup tasks within scheduling queue 190 based on the priority given thereto. If the same priority is given to two or more backup tasks, the ordering is carried out in one embodiment according to a first-come, first-served model.

In step 420, scheduler 201 determines if backup task for all VMs in the pool have been scheduled. If not, the flow returns to step 412. If so, the process ends.

At the beginning of a time window, backup service 204 begins executing backup tasks that are ordered in scheduling queue 190, beginning from the head of the queue and then working its way down the queue towards the tail. Any backup tasks for VM not completed within the time window are disposed according to a policy of the tenant owning that VM, which is defined in tenant backup parameters 188. For example, tenant AAA Inc. may specify any such backup tasks to be scheduled again in the immediately following time window, whereas BBB Corp. specify any such backup tasks to be scheduled again the following day during the same time window.

Backup service 204 executes backup tasks in the manner described above in conjunction with FIG. 3. The number of concurrent backup tasks that backup service 204 executes depends on the hardware constraints of backup storage device 102.

Figure 5:
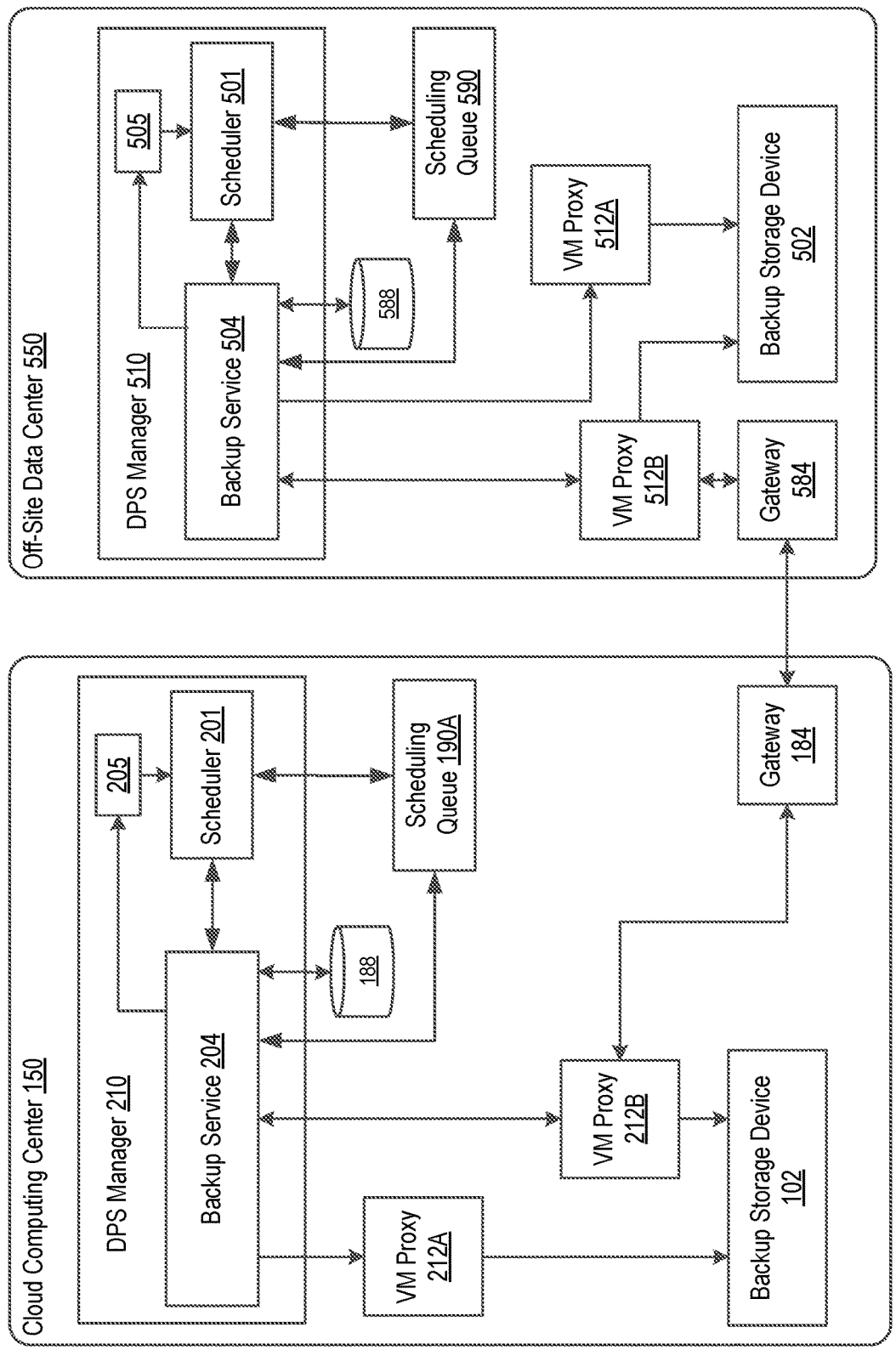
FIG. 5 is a schematic diagram depicting an off-site backup process according to an embodiment.

FIG. 5 is a schematic diagram depicting an off-site backup process according to an embodiment. FIG. 5 illustrates client computing center 150 and depicts VM proxy 212A provisioned as a backup agent for tenant A and VM proxy 212B provisioned as a backup agent for tenant B. In the embodiment illustrated in FIG. 5, VM proxy 212A executes an on-site backup process only, whereas VM proxy 212B executes both an on-site backup process and an off-site backup process.

As with on-site backups, scheduler 201 performs scheduling of off-site backups according to a fairness algorithm that takes into account tenant's backup parameters 188 and backup service generated data 205. It should be recognized that some of the system constraints, reflected in backup service generated data 205, are relevant for scheduling on-site backups but are not relevant for scheduling off-site backups, and vice versa. Thus, the fairness algorithm of scheduler 201 considers only those system constraints that are relevant for off-site backups. One key system constraint relevant for off-site backups is network bandwidth.

Similarly, tenant's backup parameters 188 specify attributes that are relevant for off-site backups. One such attribute is, of course, one that designates a VM for off-site backups. Other attributes relevant for off-site backups include an IP address of one or multiple off-site locations at which off-site backup for the designated VM is to be carried out, and a time window and frequency for performing the off-site backup. In one embodiment, tenant's backup parameters 188 indicate the following:

VM_1 of Tenant A: back up on weekly during time window of 2 AM to 4 AM, on-site and at one of two off-site locations;

VM_2 of Tenant B: back up daily during a time window of 4 AM to 6 AM, on-site only; and VM_3 of Tenant C: back up monthly during any time window, on-site and at one off-site locations; and VM_4 of Tenant C: back up daily during any time window, on-site only.

The process depicted in FIG. 4, which is described for scheduling on-site backups, is applicable to off-site backups. However, when scheduling off-site backups, the scheduled off-site backup tasks are stored in a different scheduling queue, which is depicted in FIG. 5 as scheduling queue 190A. Then, at the beginning of the relevant time window, backup service 204 begins executing off-site backup tasks that are ordered in scheduling queue 190A, beginning from the head of the queue and then working its way down the queue towards the tail. Any off-site backup tasks for VM not completed within the time window are disposed according to a policy of the tenant owning that VM, which is defined in tenant backup parameters 188. For example, tenant A may specify any such off-site backup tasks to be scheduled again in the immediately following time window, whereas tenant B may specify any such off-site backup tasks to be scheduled again the following day during the same time window.

Backup service 204 executes off-site backup tasks in the manner described above in conjunction with FIG. 6. The number of concurrent off-site backup tasks that backup service 204 executes depends on the hardware constraints of gateway 184.

Figure 6:
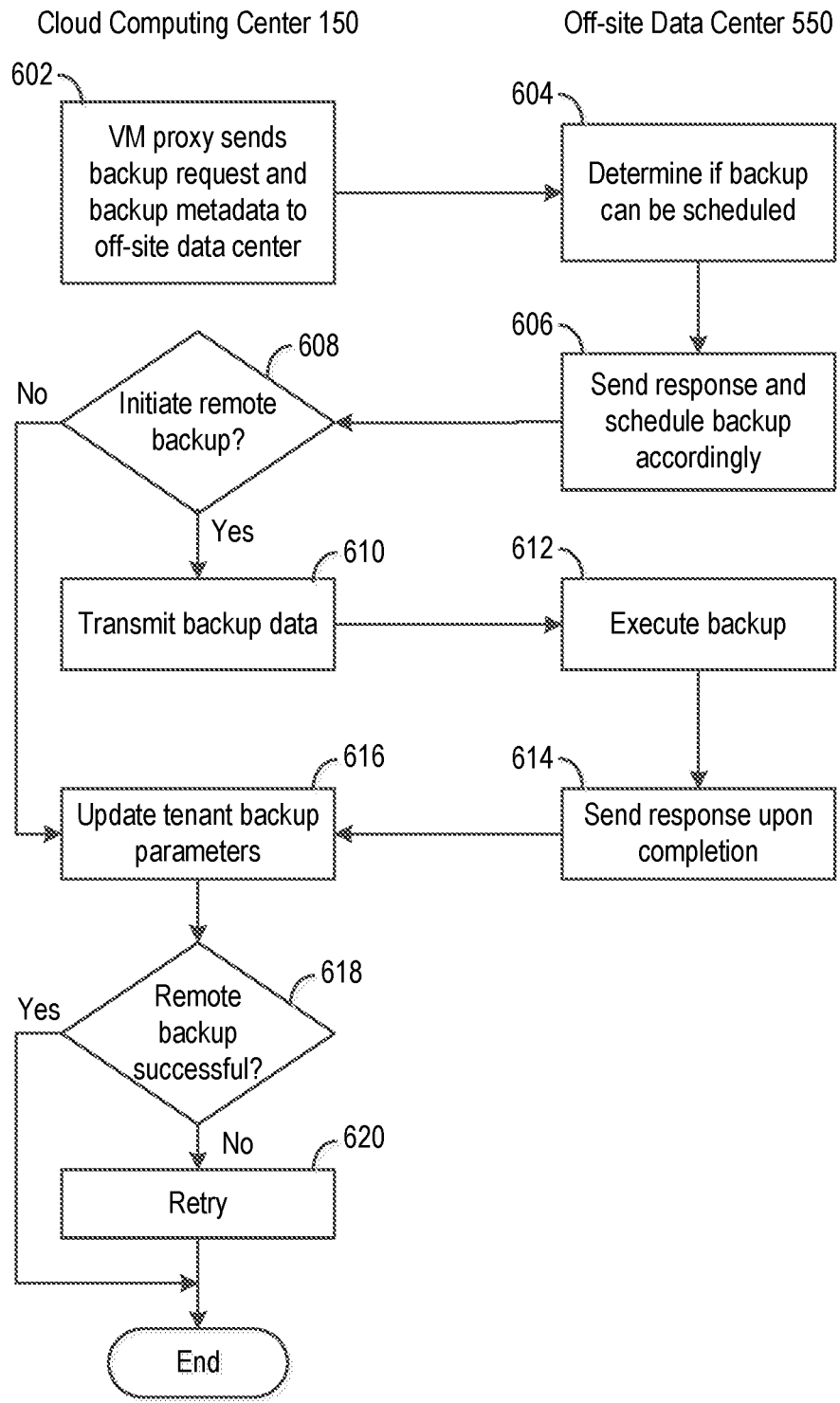
FIG. 6 is a flow diagram depicting an off-site backup process according to an embodiment.

FIG. 6 is a flow diagram depicting an off-site backup process according to an embodiment. The off-site backup process includes a process executed at two sites. The first site is cloud computing center 150 and the second site is off-site data center 550. The process of FIG. 6 begins in step 602 with VM proxy that is executing an off-site backup process, e.g., VM proxy 212B in FIG. 5, sending a backup request and backup metadata to off-site data center. The backup metadata contains the parameters for performing the backup, such as size of the VM data to be backed up (which may be the size of the entire VM or only the data blocks of the VM that have changed since the last successful backup at off-site data center 550) and time window within which the backup should be completed. Upon receipt of the backup request and backup metadata through gateway 584, VM proxy 512B, which has been provisioned within off-site data center 550 for handling backup requests received through gateway 584, forwards the backup request and the backup metadata to DPS manager 510, which manages on-site backups for off-site data center 550 (e.g., in the same manner as DPS manager 210 manages on-site backups for cloud computing center 150). DPS manager includes backup service 504 (which operate in the same manner as backup service 204) and scheduler 501 (which operate in the same manner as backup service 204). Upon receipt of the backup request and the backup metadata, backup service 504 invokes scheduler 501 in step 604 to determine if the requested backup can be scheduled. If so, in step 606, scheduler 501 inserts a backup task for the requested backup in scheduling queue 590 and sends a response indicating that the requested backup has been scheduled. If not, scheduler 501 sends a response indicating that the requested backup could not be scheduled.

In determining whether or not the requested can be scheduled, scheduler 501 references backup service generated data 505 (which contains the same type of information as backup service generated data 205, except backup service generated data 505 is generated by backup service 504 and reflects system constraints of off-site data center 550), and tenant's backup parameters 588 (which contains backup parameters specified by tenants of off-site data center 550). Consequently, the requested backup has to be scheduled among the on-site backups requested by tenants of off-site data center 550 during the requested time window. For illustration, one such backup is shown as being handled by VM proxy 512A.

VM proxy 212B in step 608 evaluates the response from off-site data center 550 to determine if it can initiate the backup. If the response indicates that the requested backup has been scheduled (step 608, Yes), VM proxy 212B transmits backup data to off-site data center in step 610. On the other hand, if the response indicates that the requested backup could not be scheduled (step 608, No), VM proxy 212B forwards this response to backup service 206, which updates tenant backup parameters 188 to reflect that the off-site backup was unsuccessful.

VM proxy 512B buffers the backup data transmitted by VM proxy 212B and at a time designated by backup service 504, VM proxy 212B instructs backup storage device 502 to store the backup data therein. Then, VM proxy 512B in step 614 sends a "success" completion response to VM proxy 212B if all of the backup data were successfully stored in backup storage device 502 within the scheduled time window, and a "failed" completion response to VM proxy 212B if all of the backup data were not successfully stored in backup storage device 502 within the scheduled time window.

VM proxy 212B forwards the completion response to backup service 204, which updates tenant backup parameters 188 to indicate whether or not the off-site backup was successful. Then, in step 618, backup service 204 determines whether or not the off-site backup service was successful. If successful, the process ends. On the other hand, if unsuccessful, backup service 204 requests a retry of the off-site backup. The request for the retry may be made to the same off-site data center 550 at a later time, e.g., a backup time window specified in tenant backup parameters 188, or to a different off-site data center 550 (wherein locations of one or more different off-site data centers are defined in tenant backup parameters 188) immediately or at a later time. In some embodiments, after a certain number of failed off-site backup attempts, no future backup attempt is scheduled. Rather, the system administrator and/or tenant are notified.

In another implementation of the multi-tenant cloud computing system, tenants specify an archival policy (specified within an SLA and stored in tenant backup parameters 188), which specifies when archival is to be triggered. For example, tenants may specify a retention period for its backup data stored in backup storage device 102. When this retention period lapses, the archival of the backup data is scheduled. Tenants may also specify certain conditions in the archival policy to automatically trigger the archival process. One example of such a condition is when the tenant is close to running out of backup storage space in backup storage device 102 that it has purchased. Tenants may also assign priorities, such that their lower priority backup data are archived prior to their higher priority backup data.

Accordingly, in general, tenants are given the option of archiving their backup data to an archival storage device, e.g., an object store accessible over the Internet. This option gives tenants the flexibility to keep more recent or higher priority backups on faster (in terms of recovery time), more expensive storage, and older or lower priority backups on slower (in terms of recovery time), less expensive storage. In some embodiments, the cost difference in terms of per unit of storage capacity (e.g., cost per GB) is one or more orders of magnitude higher with faster storage relative to slower storage. In addition, the object store may be operated locally, i.e., within cloud computing system 150, or remotely, e.g., within a data center owned by the tenant or a third party. In the embodiment illustrated herein, the object store is offered by a blob storage service over the Internet.

Archival operations do not have a specific time window for completion, but instead, provide a date after which the backup data can be archived. A tenant is not charged backup storage fees if backup data remains on backup storage after the archival date. This allows flexibility to schedule an archive operation at a time when system constraints are low and the archival process is able to complete without jeopardizing the potential completion of other operations, such as backups and restores.

In some embodiments, backup storage device 102 maintains different tiers of storage and the archival policy set by the tenant may specify older backup data (e.g., backup data that are 2-3 months old v. less than 2 months old) to be stored in a slower tier storage and the oldest backup data (e.g., backup data that is more than 3 months old) be archived in the object store. Backup service 204 manages the overall backup history by maintaining the relationship between the blocks in the object store and the different storage tiers to the workload image that is backed up and the time of the backup.

In general, archival operations "move" backup data previously stored by backup storage device 102 to archival storage. During archival, the process of "moving" data entails reading contents from a first storage (e.g., storage provided by backup storage device 102), followed by transmitting the contents to a second storage (e.g., object store) and deletion or invalidation of the contents from the first storage, so that storage space will be freed up at the first storage.

Figure 7:
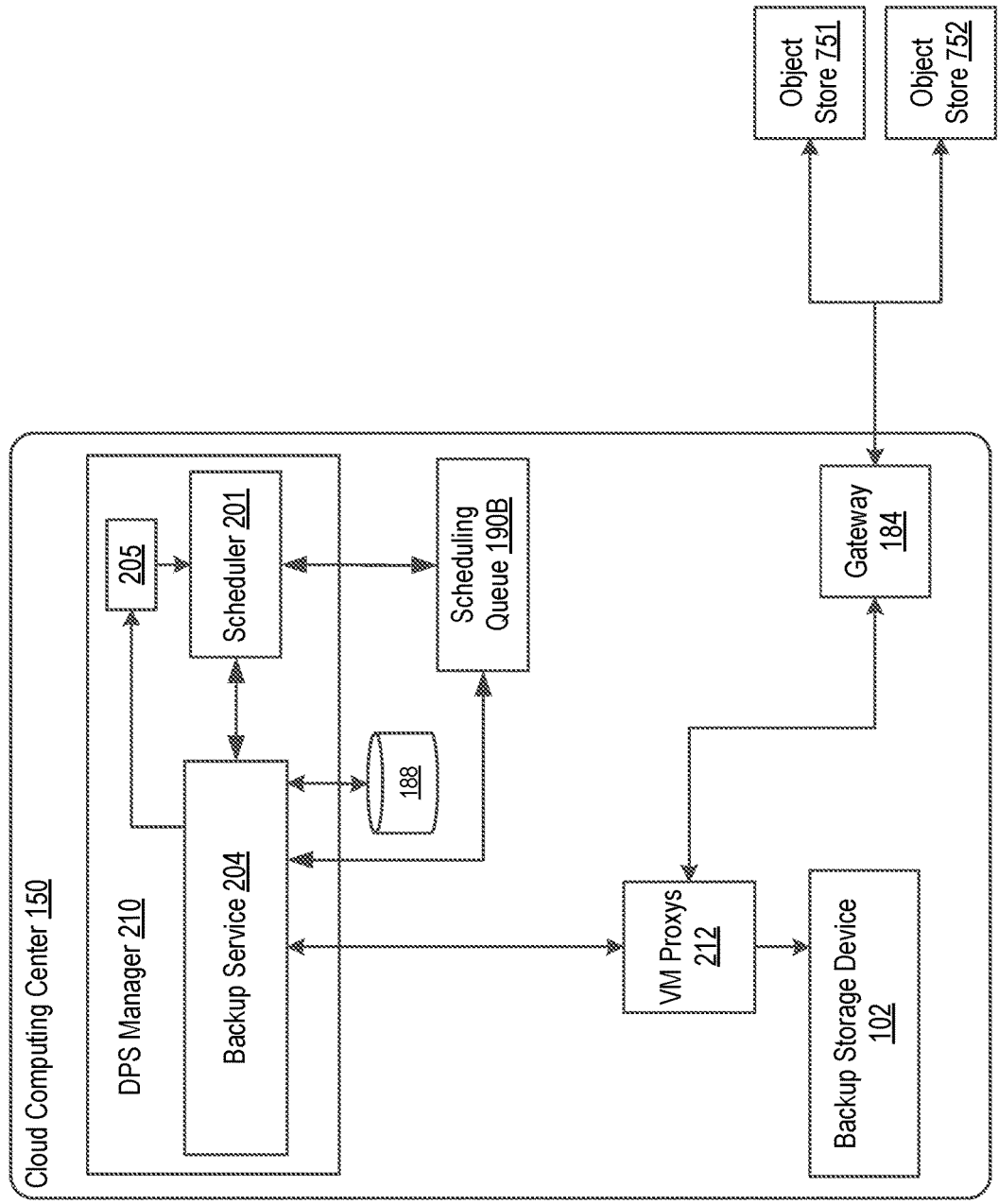
FIG. 7 is a conceptual diagram of the components that are employed during archival of backup data according to an embodiment.

FIG. 7 is a conceptual diagram of the components that are employed to enable archival to object store, according to an embodiment. As depicted, gateway 184 presents to proxy VMs 212 (operating as backup agents for hosts 162) object stores 751, 752 to which archive IOs are directed. After backup to backup storage device 102 is performed, scheduler 201 of backup service 204 schedules an archival of the backup data to an object store according to an archival policy set by the tenant. The scheduled archival operation is added to scheduling queue 190B. When an archival task scheduled in scheduling queue 190B is triggered, proxy VM 212 reads out the appropriate data from backup storage device 102 and transmits archive IOs through gateway 184 to the object store, the location of which is also specified in the archival policy.

Figure 8:
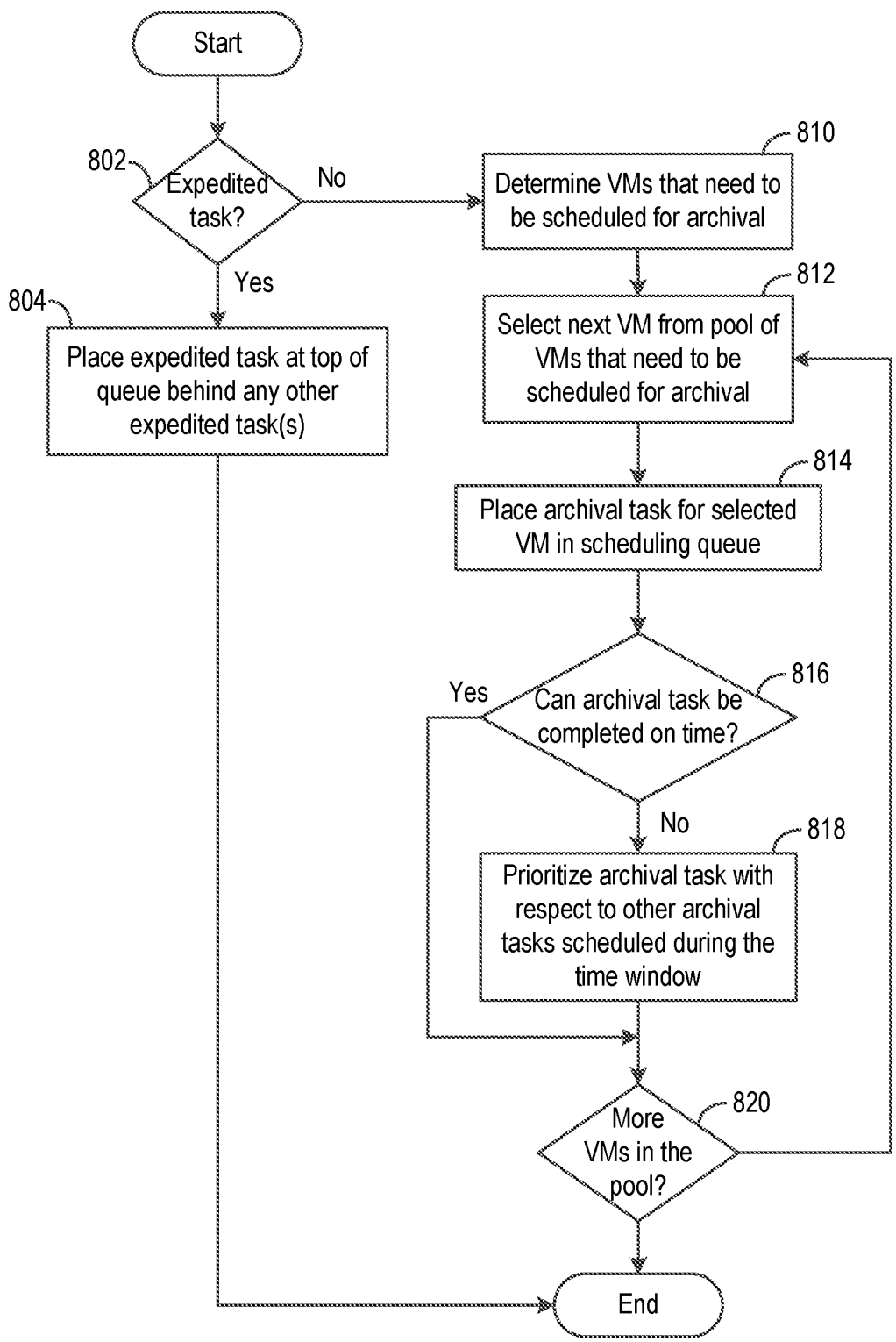
FIG. 8 is a flow diagram depicting a process of scheduling archival of backup data according to an embodiment.

FIG. 8 is a flow diagram that depicts a process for scheduling (by scheduler 201) an archival task to be performed by backup service 204, according to an embodiment. The process is triggered by a request for an expedited archival task, such as by a tenant when the tenant is close to running out of storage space in backup storage device 102 that it has purchased. The process is also triggered periodically at the beginning of a time window for performing archival tasks by backup service 204 so that scheduling queue 190B can be prepared for consumption by backup service 204 during the time window.

The process depicted in FIG. 8 begins in step 802, where scheduler 201 determines whether or not the archival task to be scheduled is an expedited archival task requested by a tenant, e.g., when the tenant is close to running out of storage space in backup storage device 102 that it has purchased. If the task is determined to be an expedited archival task in step 802, scheduler 201 places the expedited archival task in scheduling queue 190 ahead of all non-expedited archival tasks, such normal archival tasks, and behind other expedited archival tasks that scheduler 201 may have placed in scheduling queue 190 at an earlier time.

If the archival task is determined not to be an expedited archival task in step 802, which means that the process is being triggered to prepare scheduling queue 190B for consumption by backup service 204, scheduler 201 in step 810 determines a pool of VMs that are to be archived during the time window. For example, if the time window is from 2 AM to 4 AM, the process of FIG. 8 would be triggered at 2 AM. Scheduler 201 obtains information about which VMs are to be archived during the time window (e.g., 2 AM to 4 AM) from tenant backup parameters 188. In addition to the VMs that are designated in tenant backup parameters 188 to be archived during the time window, there may be other VMs that have been added to the pool, e.g., VMs that were scheduled to be archived during a prior time window but could not be archived within that prior time window. In addition, VMs in the pool may belong to different tenants. In one embodiment, some of the VMs in the pool belong to a first tenant, e.g., AAA Inc., and some of the VMs in the pool belong to a second tenant, BBB Corp.

After the pool of VMs to be backed up during the time window are identified in step 810, scheduler 201 executes steps 812, 814, 816, 818 (if needed), and 820 for each VM in the pool. Each of steps 812, 814, 816, 818, and 820 is further described below.

In step 812, scheduler 201 selects one of the VMs in the pool that has not yet been scheduled. Then, scheduler 201 places archival task for archiving the selected VM in scheduling queue 190B. In step 816, scheduler 201 evaluates, based on the system constraints contained in the backup service generated data 205, the size of the VM data to be archived, and other archival tasks that are scheduled, whether the archival task being added can be completed on time. If so, scheduler 201 places the backup task in scheduling queue 190B. If not, scheduler 201 performs a prioritization of the archival tasks in scheduling queue 190B including the archival task being added, in step 818. Prioritization in this context means ordering of the archival tasks within scheduling queue 190B based on the priority given thereto. For example, in contrast to on-site backup operations described above, VMs having higher priority are archived after VMs having lower priority, so as to keep the VMs having higher priority in a location where the VMs can be accessed with higher data retrieval speeds, e.g., in backup storage device 102 instead of object store 751 or 752. If the same priority is given to two or more archival tasks, the ordering is carried out in one embodiment according to a first-come, first-served model.

In step 820, scheduler 201 determines if archival task for all VMs in the pool have been scheduled. If not, the flow returns to step 812. If so, the process ends.

At the beginning of a time window, backup service 204 begins executing archival tasks that are ordered in scheduling queue 190B, beginning from the head of the queue and then working its way down the queue towards the tail. Any archival tasks for VM not completed within the time window are disposed according to a policy of the tenant owning that VM, which is defined in tenant backup parameters 188. For example, tenant AAA Inc. may specify any such archival tasks to be scheduled again in the immediately following time window, whereas BBB Corp. specify any such archival tasks to be scheduled again the following day during the same time window.

Figure 9:
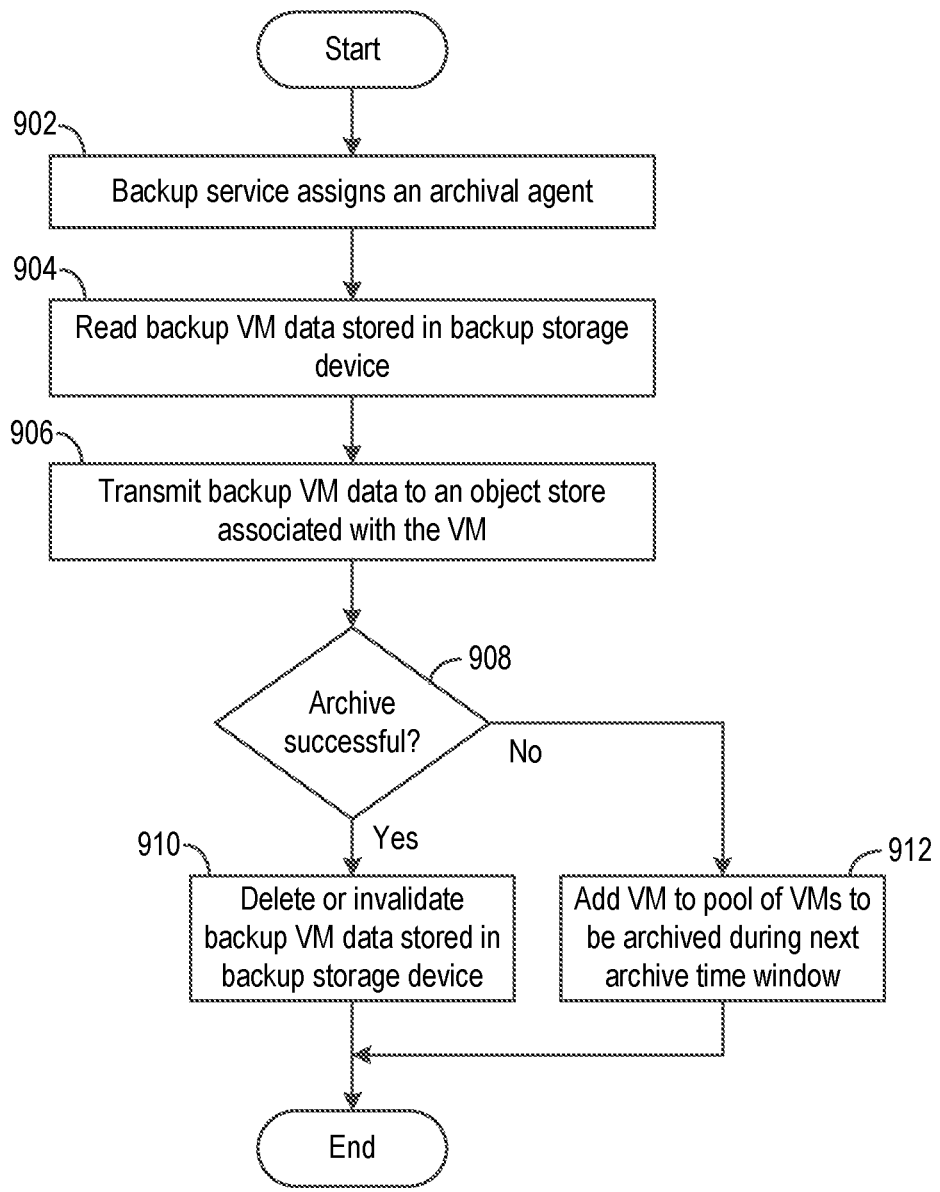
FIG. 9 is a flow diagram depicting a process of archiving backup data according to an embodiment.

Backup service 204 executes archival tasks in the manner described in conjunction with FIG. 9. The number of concurrent archival tasks that backup service 204 executes depends on hardware constraints of gateway 184.

FIG. 9 is a flow diagram depicting a process of archiving backup data according to an embodiment. Backup service 204 assigns an archival agent, e.g., VM proxy 212, to carry out the archival operation. In step 904, the archival agent reads backup VM data from backup storage device 102. Then, in step 906, archival agent transmits the backup VM data to an object store associated with the VM (as designated in tenant backup parameters 188). In step 908, archival agent determines whether or not the archival operation was successful based on a response from the designated object store. If the archival operation is successful (step 908, Yes), the archival agent deletes or invalidates the backup VM data stored in backup storage device 102. If the archival operation is not successful (step 908, No), the archival agent adds the VM to pool of VMs to be archived during the next archive time window.

In some embodiments, after a certain number of failed archival attempts for a VM as determined in step 908, no future archival attempts are scheduled for the VM. Rather, the system administrator or the tenant owning the VM is notified. Optionally, a manual archival operation may be performed for such a VM.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of backing up workloads for multiple tenants of a computing system, comprising:
   scheduling backup of a second workload having a second priority to occur before backup of a first workload having a first priority occurs because the second priority is higher priority than the first priority;
   backing up the second workload as second backup data to a backup storage device of the computing system based on the scheduling, the second backup data being assigned the second priority;
   backing up the first workload as first backup data to the backup storage device based on the scheduling, the first backup data being assigned the first priority;
   triggering an archival process according to an archival policy set by a tenant;
   placing archival tasks in a scheduling queue and prioritizing the archival tasks in the scheduling queue;
   responsive to a request for an expedited archival task, placing the expedited archival task in the scheduling queue behind other expedited archival tasks and ahead of all other archival tasks; and
   executing the archival process according to an order of the archival tasks in the scheduling queue by reading the first backup data and the second backup data of the tenant stored in the backup storage device and transmitting the first backup data and the second backup data to an archival store designated in the archival policy, and then deleting or invalidating the first backup data and the second backup data stored in the backup storage device, wherein
   a first archival task for archiving the first backup data is performed prior to a second archival task for archiving the second backup data during the execution of the archival process because the second priority is higher than the first priority.

2. The method of claim 1, wherein the expedited archival task is requested when storage space in the backup storage device for a tenant falls below a minimum threshold.

3. The method of claim 1, wherein the backup storage device has a first tier of storage and a second tier of storage that is slower than the first tier of storage, and first backup data for the tenant is stored in the first tier of storage and second backup data for the tenant, which has been retained for a longer period of time in the backup storage device than the first backup data, is stored in the second tier of storage.

4. The method of claim 3, wherein third backup data for the tenant, which has been retained for a longer period of time in the backup storage device than the second backup data, is scheduled for archival.

5. The method of claim 1, wherein the archival store is an object store.

6. A non-transitory computer readable medium comprising instructions to be executed in a computer for managing backups of workloads for multiple tenants of a computing system, wherein the instructions when executed in the computer cause the computer to carry out steps including:
   scheduling backup of a second workload having a second priority to occur before backup of a first workload having a first priority occurs because the second priority is a higher priority than the first priority;
   backing up the second workload as second backup data to a backup storage device of the computing system based on the scheduling, the second backup data being assigned the second priority;
   backing up the first workload as first backup data to the backup storage device based on the scheduling, the first backup data being assigned the first priority;
   triggering an archival process according to an archival policy set by a tenant;
   placing archival tasks in a scheduling queue and prioritizing the archival tasks in the scheduling queue;
   responsive to a request for an expedited archival task, placing the expedited archival task in the scheduling queue behind other expedited archival tasks and ahead of all other archival tasks; and
   executing the archival process according to an order of the archival tasks in the scheduling queue by reading the first backup data and the second backup data of the tenant stored in the backup storage device and transmitting the first backup data and the second backup data to an archival store designated in the archival policy, and then deleting or invalidating the first backup data and the second backup data stored in the backup storage device, wherein
   a first archival task for archiving the first backup data is performed prior to a second archival task for archiving the second backup data during the execution of the archival process because the second priority is higher than the first priority.

7. The non-transitory computer readable medium of claim 6, wherein the expedited archival task is requested when storage space in the backup storage device for a tenant falls below a minimum threshold.

8. The non-transitory computer readable medium of claim 6, wherein the backup storage device has a first tier of storage and a second tier of storage that is slower than the first tier of storage, and first backup data for the tenant is stored in the first tier of storage and second backup data for the tenant, which has been retained for a longer period of time in the backup storage device than the first backup data, is stored in the second tier of storage.

9. The non-transitory computer readable medium of claim 8, wherein third backup data for the tenant, which has been retained for a longer period of time in the backup storage device than the second backup data, is scheduled for archival.

10. A computing system comprising:
a plurality of computers in each of which workloads are running, the workloads including workloads for a first tenant and workloads for a second tenant; and
a backup storage device configured to store backup images of the workloads for both the first tenant and the second tenant, wherein
one of the plurality of computers has running therein a data protection service that performs the steps of:
scheduling backup of a second workload having a second priority to occur before backup of a first workload having a first priority occurs because the second priority is a higher priority than the first priority;
backing up the second workload as second backup data to the backup storage device based on the scheduling, the second backup data being assigned the second priority;
backing up the first workload as first backup data to the backup storage device based on the scheduling, the first backup data being assigned the first priority;
triggering an archival process according to an archival policy set by a tenant;
placing archival tasks in a scheduling queue and prioritizing the archival tasks in the scheduling queue;
responsive to a request for an expedited archival task, placing the expedited archival task in the scheduling queue behind other expedited archival tasks and ahead of all other archival tasks; and
executing the archival process according to an order of the archival tasks in the scheduling queue by reading the first backup data and the second backup data of the tenant stored in the backup storage device and transmitting the first backup data and the second backup data to an archival store designated in the archival policy, and then deleting or invalidating the first backup data and the second backup data stored in the backup storage device, wherein
a first archival task for archiving the first backup data is performed prior to a second archival task for archiving the second backup data during the execution of the archival process because the second priority is higher than the first priority.

11. The computing system of claim 10, wherein the backup storage device has a first tier of storage and a second tier of storage that is slower than the first tier of storage, and first backup data for the tenant is stored in the first tier of storage and second backup data for the tenant, which has been retained for a longer period of time in the backup storage device than the first backup data, is stored in the second tier of storage.

12. The computing system of claim 11, wherein third backup data for the tenant, which has been retained for a longer period of time in the backup storage device than the second backup data, is scheduled for archival.

* * * * *